United States Patent
Kranz et al.

(10) Patent No.: US 6,318,204 B1
(45) Date of Patent: Nov. 20, 2001

(54) HELICAL GEAR

(75) Inventors: Gerhard Kranz, Wetzlar; Rolf Crema, Ehringshausen; Peter Schmidt, Huttenberg, all of (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 09/671,578

(22) Filed: Sep. 27, 2000

Related U.S. Application Data

(63) Continuation of application No. PCT/DE99/00923, filed on Mar. 26, 1999.

(30) Foreign Application Priority Data

Mar. 27, 1998 (DE) .............................................. 198 13 637

(51) Int. Cl.⁷ .................................................. F16H 27/02
(52) U.S. Cl. .......................................... 74/441; 74/89.42
(58) Field of Search ........................... 74/89.15, 424.8 R, 74/459, 441

(56) References Cited

U.S. PATENT DOCUMENTS

| | | | |
|---|---|---|---|
| 3,975,968 | * | 8/1976 | Chaffin .................................. 74/441 |
| 5,127,285 | | 7/1992 | Granhom ............................. 74/527 |
| 5,331,861 | | 7/1994 | Joffe ........................................ 74/89 |
| 5,392,662 | | 2/1995 | Jadrich et al. ............................ 74/89 |
| 5,644,951 | | 7/1997 | Hatamura ................................. 74/89 |
| 5,971,675 | * | 10/1999 | Romi .................................... 408/171 |

FOREIGN PATENT DOCUMENTS

| | | |
|---|---|---|
| 34 44 357 | 6/1985 | (DE) . |
| 36 15 128 | 5/1987 | (DE) . |
| WO99/50571 | 3/1999 | (WO) . |

OTHER PUBLICATIONS

Herausgeber, Prof. Dr. –Ing. Habil. Werner Krause, "Konstrucktionselemente der Feinmechanik", pp. 709–722 (1989).

* cited by examiner

*Primary Examiner*—David Fenstermacher
(74) *Attorney, Agent, or Firm*—Foley & Lardner

(57) ABSTRACT

Screw mechanism having a spindle (1) which is secured in the axial direction and has a spindle axis (1'), and a spindle nut (5) which is connected to a slide (7) which can be driven and is guided in the axial direction, a joint being provided between the spindle nut (5) and the slide (7) in order to compensate for relative transverse movements and tilting between the spindle nut (5) and slide (7), said joint being formed symmetrically to the spindle axis (1') and having two joint axes which are perpendicular to each other, intersect on the spindle axis (1') and are assigned at one end to the transverse movement of a bearing plate (6), which is connected to the spindle nut (5), and at the other end to the transverse movement of a bearing plate (8), which is connected to the slide (7), and said joint containing an intermediate plate (9) via which the bearing plates (6, 8) are connected pivotably to each other in order to compensate for any tilting of their joint axes. The joint axes are each formed by two balls (19, 20; 19', 20') which are arranged aligned with one another on opposite sides of the spindle axis (1'), are mounted in mutually opposite prism grooves (17, 18; 17', 18') in the bearing plates (6, 8) and the intermediate plate (9), and bear against one another under spring pressure (13, 16; 13', 16').

10 Claims, 4 Drawing Sheets

HELICAL GEAR

CROSS-REFERENCE TO RELATED APPLICATIONS

This application is a continuation of PCT Application PCT/DE99/00923, filed Mar. 26, 1999, which in turn claims priority from German application 198 13 637.4, filed Mar. 27, 1998. The entire contents of the PCT and German application are incorporated herein by reference.

BACKGROUND OF THE INVENTION

1. Field of the Invention

The invention relates to a helical gear having a spindle which is secured in the axial direction and has a spindle axis, and a spindle nut which is connected to a slide which can be driven and is guided in the axial direction, a joint being provided between the spindle nut and the slide in order to compensate for relative transverse movements and tilting between the spindle nut and slide, said joint being formed symmetrically to the spindle axis and having two joint axes which are perpendicular to each other, intersect on the spindle axis and are assigned at one end to the transverse movement of a bearing plate, which is connected to the spindle nut, and at the other end to the transverse movement of a bearing plate, which is connected to the slide, and said joint containing an intermediate plate via which the bearing plates are connected pivotably to each other in order to compensate for any tilting of their joint axes.

2. Description of the Related Art

Helical gears of this type are known and are described, for example, in The textbook "Korstruktionselemente der Feinmechanik" [Structural elements in precision mechanics], edited by Werner Krause, Hanser publishers (1989), pp. 709 ff. The spindle is rotatable, but is not displaced in the axial direction. The spindle nut is retained in a longitudinal guide parallel to the axis of the spindle and is therefore not rotatable. Rotation of the spindle is therefore converted into a sliding movement of the spindle nut. The object carrier which is to be driven is connected to the spindle nut.

With helical gears it is possible, through the selection of sufficiently long spindles, to obtain drives over very long displacement paths. Generally, not too much has to be demanded as concerns the quality of the screw thread of the spindle although, for example, hardened spindles having a ground screw thread for great thread precision are preferable. Play between the screw threads of the spindle nut and the spindle can be compensated for by the spindle nut undergoing a division with the parts spring-loaded against one another. The axes of long spindles are generally not exactly linear. Particularly in the case of thin spindles, they can either be slightly bent or even corrugated. Since they are only mounted in their end regions, the spindle nut therefore executes slight upward and downward movements and also lateral movements along its displacement path. Such eccentricity in the concentric running of the spindle is also produced if the axis of a driving motor and the spindle axis are not aligned with each other.

If, on the other hand, the axial guiding of the slide defines the displacement path vertically and laterally, there occur, in particular in the case of very precise slide guides, distortions between the driven nut and the slide. These distortions can be further reinforced if the bearings of the spindle are not arranged for alignment exactly parallel to the displacement path. Distortions of this type considerably impair the running characteristics and the positioning precision of the slide.

U.S. Pat. No. 5,392,662 discloses a helical gear in which the above mentioned error effects are compensated for by a joint fitted between the spindle nut and slide. The joint consists of a contact-pressure plate which is connected to the spindle nut, an intermediate plate and a contact-pressure plate which is connected to the slide. Each of the bearing plates is connected to the intermediate plate via two spring clips. The two spring clips of a bearing plate lie parallel to each other on opposite sides of the spindle axis, the two pairs of spring clips being arranged perpendicular to each other. The spring clips are fastened to the bearing plates by their rounded part and to the intermediate plate by their foot parts. As a result, each of the bearing plates is guided, with regard to a transverse movement, by a spring parallelogram and, with regard to tilting, can be rotated about an axis. The joint is configured symmetrically to the spindle axis and contains a non-positive connection between the driving and driven system. In this case, linear compression or deformation of the spring clips in the case of resistance between the spindle drive and slide guide or in the case of relatively high driving frequencies cannot be ruled out. The deflection of the spring clips during the transverse movement produces a force reaction on the spindle, said reaction increasing with the deflection.

BRIEF SUMMARY OF THE INVENTION

The invention was therefore based on the object of realizing a helical gear of a simple type of construction, in which tolerances caused by the manufacturing and type of construction in the straightness of the spindle and the alignment of its bearings with respect to the slide guide do not have any negative effects on the slide guide. The intention is for the rotatory movement of the spindle to be converted with the highest possible quality into a lateral movement which is as strictly proportional as possible. At the same time, the intention is for the mutual reactions between the driving and driven system to be as small as possible. In addition, during the transmission of the actuating force the intention is that the active vector, if possible, does not produce any secondary torques which stress the system, particularly at relatively high driving frequencies.

According to the invention, this object is achieved in the case of a helical gear of the type mentioned at the beginning by the joint axes each being formed by two balls which are arranged aligned with one another on opposite sides of the spindle axis, are mounted in mutually opposite prism grooves in the bearing plates and the intermediate plate, and bear against one another under spring pressure.

Advantageous refinements emerge from the features of subclaims.

The interconnection of the joint configured in accordance with the invention enables the spindle nut to execute, in the case of deflection and tilting taking place exclusively by rolling, all necessary compensating movements with respect to the slide with the smallest possible frictional forces. The joint, which is free of play and is secured rotationally by the form-fitting bearing of the joint elements in the driving direction, ensures that the positioning precision of the drive is not affected during a reversal of movement.

The joint axes lie staggered at a short distance one behind another in the axial direction. The actuating vector for uncoupling actuating forces from the spindle or coupling them back into the spindle therefore always passes back through the spindle axis. In this manner, axial forces from mass accelerations act on the spindle nut in a manner free of secondary torques. The effects of different flank inclinations of the spindle and also of a twisted spindle axis are not reinforced during rotation about the spindle axis, but are halved on account of the symmetrical coupling arrangement.

Movements taking place radially between the nut and driven slide are absorbed via the balls rolling is prisms. The frictional torque which can be transmitted to the nut from the rotation of the spindle is therefore very small, with the result that only very small mutual rotatory reactions are produced.

As the bearings for the balls use is made of mutually opposite prism grooves which can be restricted in their longitudinal extent. The balls lying in prism grooves execute translatory compensating movements and tiltings at the lowest possible frictional forces.

The prism grooves are expediently open on both sides, it being possible for them to be milled in the workpiece in one working step. The balls can then be secured in a special cage against lateral migration. The cage or the balls in the cage are to be able to follow the compensating movements.

The cage can be designed as a thin disk which has elongate holes lying transversely to the direction of the prism grooves for holding the balls and contains centering edges on both sides with a lug to secure against rotation, said centering edges engaging in the holes in the mutually opposite bearing and intermediate plates, at least the centering edge being enclosed in the hole in the intermediate plate with radial play.

The production of very precisely aligned prism grooves as ball paths of high surface quality is possible cost-effectively only in the case of continuous, laterally open paths. Run-on slopes, which are unfavorable in particular also for the positioning precision of the balls, at the end of separately milled ball paths are therefore avoided.

The advantage of continuous prism grooves without the necessity of fitting a cage can be realized by the fact that one of the mutually opposite plates has a linear prism groove intersecting the spindle axis, and the other plate has two linear prism grooves which are at a distance from the spindle axis and run perpendicular to the prism groove intersecting the spindle axis. The ball lies in each case in the intersecting point of the prism grooves.

BRIEF DESCRIPTION OF THE DRAWINGS

Exemplary embodiments of the helical gear according to the invention are illustrated schematically in the drawing and are described below. In the drawing

DETAILED DESCRIPTION OF THE EMBODIMENTS

Figure 1:
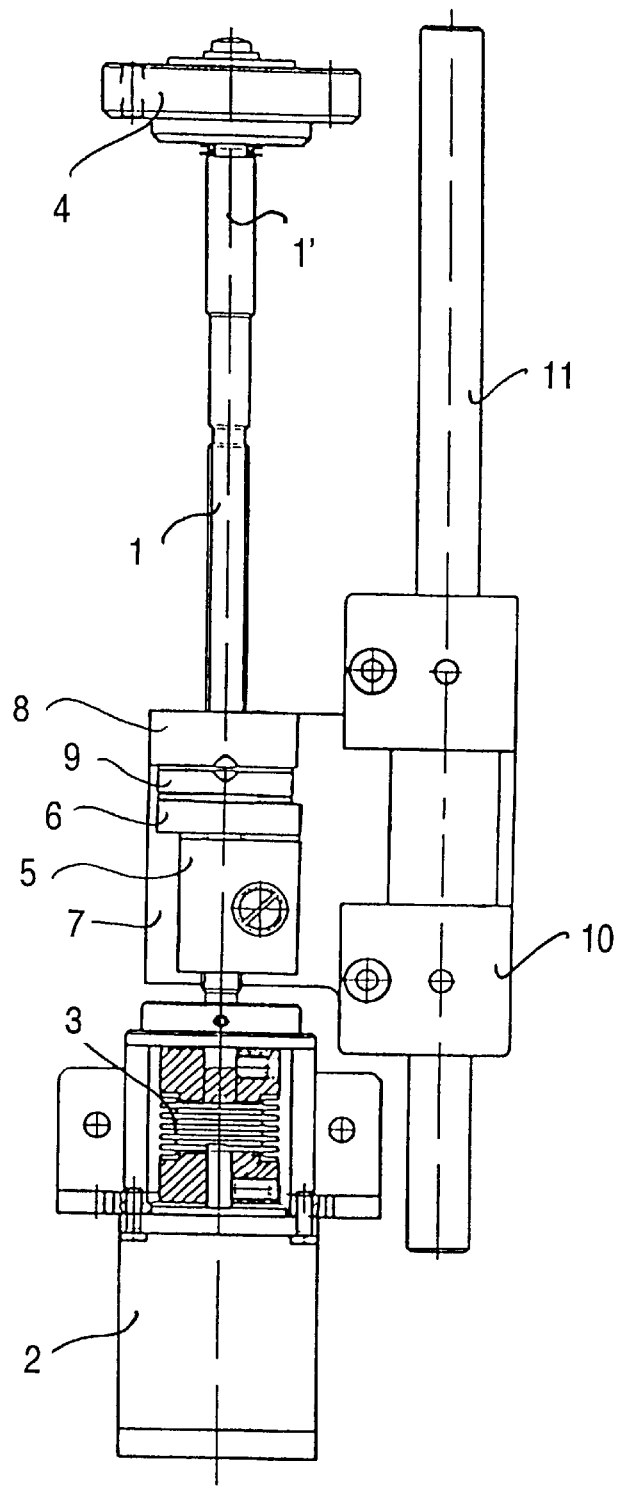
FIG. 1 shows an overall illustration of the helical gear.

In FIG. 1, a spindle 1 is driven by a stepping motor 2 which is connected to the spindle 1 via a shaft coupling 3. At its other end, the spindle 1 runs in a ball bearing 4. The shaft coupling compensates for any alignment deviations between the spindle axis 1' and the motor axis.

A spindle nut 5 which has a bearing plate 6 is coupled to the spindle 1. A further bearing plate 8 is fastened to a slide 7. Between the bearing plates 6 and 8 is an intermediate plate 9 which can be tilted about two axes, which are to be described later, and can be displaced along these axes. The slide 7 is connected to a pretensioned, highly precise ball guide 10 which runs along a cylindrical rod 11. The bearing brackets of the rod 11, the ball bearing 4 and the motor 2 are not illustrated. They are aligned in such a manner that the spindle 1 and the rod 11 are parallel to each other and lie in one plane. The aim is for the spindle 1 to pass through the mass center of gravity of the slide 7 in order to avoid tilting moments during the drive acceleration. However, this problem is virtually negligible when highly precise ball guides 10 are used for the slide 7.

Figure 2A:
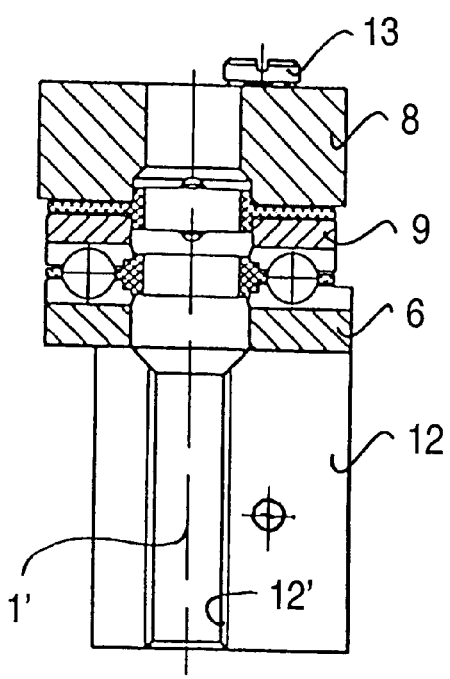
FIG. 2 shows a sectional illustration through the spindle nut with a joint.

In FIG. 2a, the spindle nut 5 is illustrated in a view of the lower part 12 of the nut together with a section through the joint. The bearing plate 6 is situated on the lower part 12. The spindle 1, which is not illustrated here, lies in the screw thread 12' of the lower part 12 and extends through holes in the bearing plates 6 and 8 and also the intermediate plate 9, which plates are held together resiliently by means of a screw 13 and a screw 13' arranged mirror-symmetrically with respect to the spindle axis 1'.

Figure 2B:
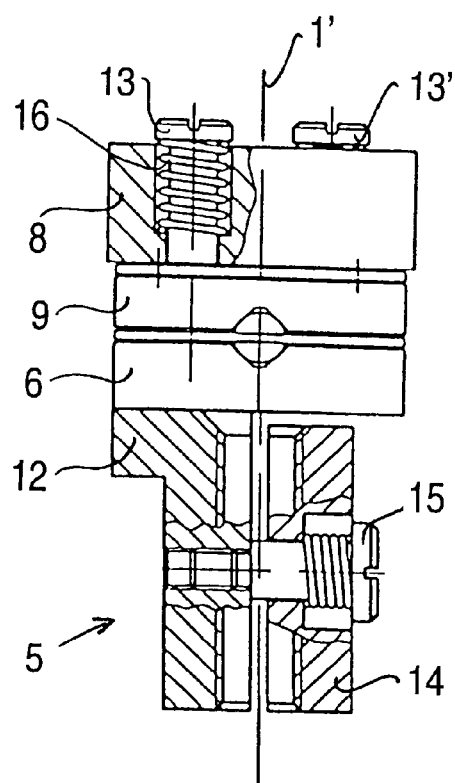

In the sectional illustration through the spindle nut in FIG. 2b, which illustration is rotated by 90°, the upper part 14 of the nut is also illustrated. It is connected to the lower part 12 by means of a screw 15 which is under spring pressure. The screw 13 is under the pressure of a spring 16. The same applies to the screw 13', which is also indicated here, with spring 16'.

Figure 3C:
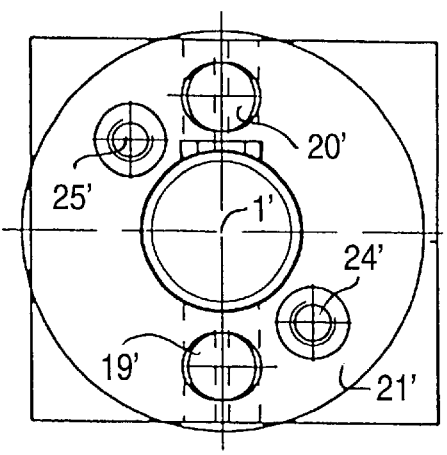
FIGS. 3a–d show a first embodiment of the joint with a cage for holding the balls.
Figure 3A:
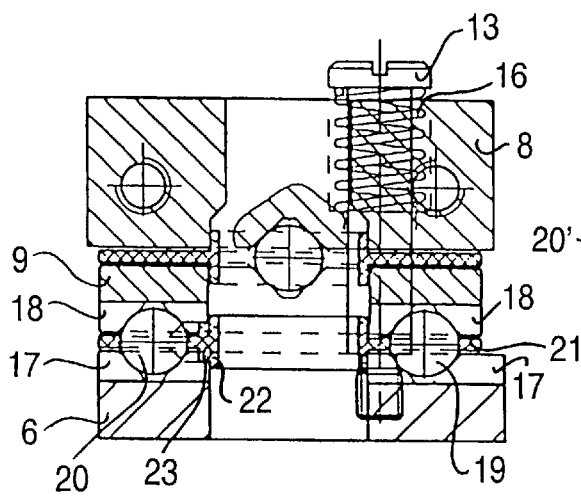

FIG. 3a shows details of the joint in an illustration which is partially cut open. A continuous prism groove 17 is milled into the bearing plate 6. An identical prism groove 18 is milled into the intermediate plate 9. Lying in these prism grooves 17, 18 are two balls 19, 20 which are retained by a cage 21. The cage 21 has a centering edge 22 and a lug 23 on both sides, by means of which it is retained in a manner secured against rotation in the central hole in the bearing plate 6 and the intermediate plate 9 and also by engagement of the lug 23 in the grooves 17, 18. The fit of the centering edges is designed with play. In this case, it is of advantage if the play is present both in the bearing plate 6 and in the intermediate plate 9. During translatory compensating movements, the balls can then roll along the direction of the groove and carry the cage along with them. The frictional forces produced by the point bearing of the balls in the cage are minimal, particularly if a plastic material having good sliding properties is selected for the cage. In principle, however, it is also sufficient for the translatory relative movement if, for example, the play is only present in the intermediate plate. The balls can then be positioned with the cage in a more precise manner With respect to their stroke central point. However, during translatory compensating movements the balls then slide because of the fixing of the cage on one side.

Figure 3B:
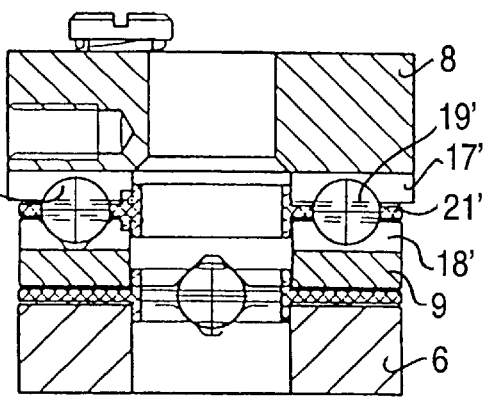

As can be gathered from the illustration in FIG. 3b which is rotated by 90°, there is an identical construction of prism grooves 17', 18', balls 19', 20'° and cage 21' between the bearing plate 8 and the other side of the intermediate plate 9. The two prism grooves which are at 90° with respect to each other on both surfaces of the intermediate plate ensure a translatory yielding in all directions. The centering edges 22 also serve to cause a restriction of the transverse movement so as to prevent the intermediate plate 9 and the bearing plate 6, 8 from coming into contact with the spindle 1, the screws 13 and springs 16.

Figure 3D:
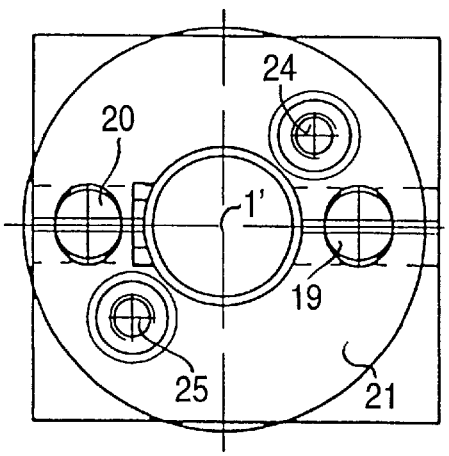

FIGS. 3c and 3d show a view of the cages 21, 21'. The holes for holding the balls 19, 20; 19', 20' are slightly stretched perpendicular to the direction of the prism grooves, with the result that only a pointlike bearing of the balls against the cage takes place in the piercing point of the tilting axis and this point bearing is retained even in the case of possible alignment tolerances of the holes with respect to the prism grooves during the positioning of the balls. The respective joint axis is provided by the connecting line between the ball central points, which line cuts across the spindle axis 1'.

Figure 3E:
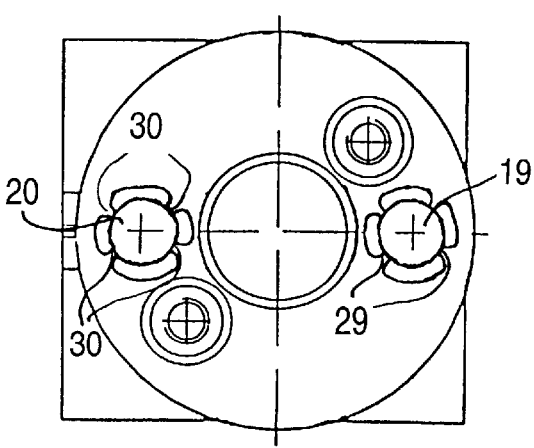
FIG. 3e shows, a further embodiment of the cage.
Figure 4C:
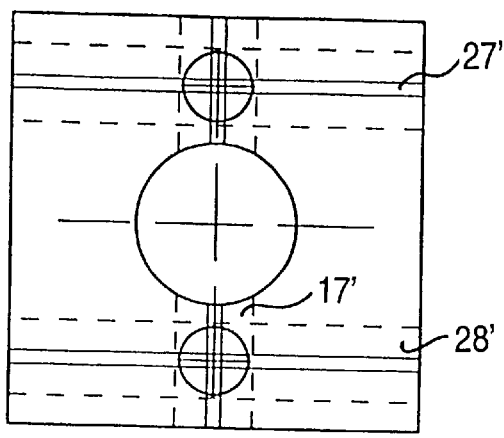
FIGS. 4a–d show a second embodiment of the joint.
Figure 4A:
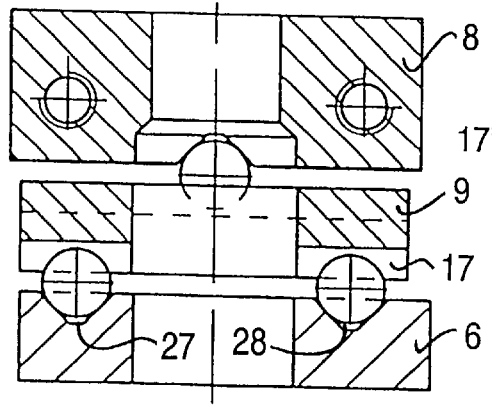
Figure 4B:
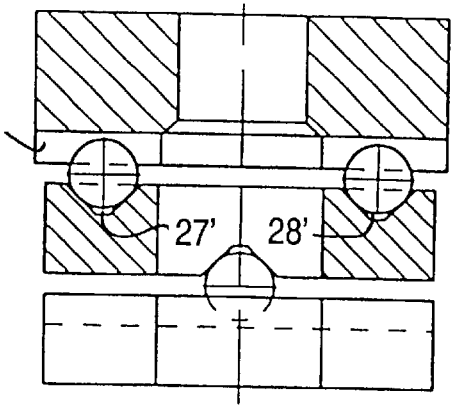
Figure 4D:
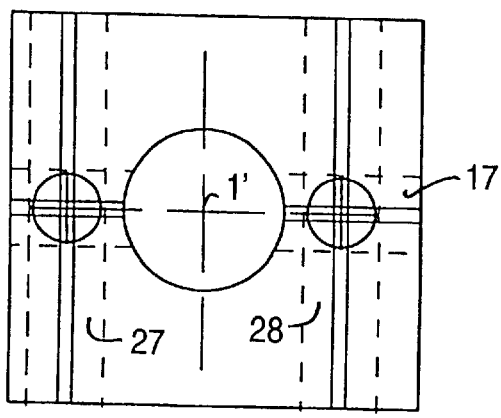

FIG. 3e shows a view of another refinement of the holding of the balls in the cage 21. The holes for holding the balls 19, 20 are of circular design here and have a relatively large diameter. Oppositely directed spring elements 29, 30 which support the balls 19, 20 are integrally formed on the hole edges in the radial direction. The free ends of these spring elements 29, 30 lie outside the plane of projections. The cage 21 is expediently centered without play, so that a defined stroke central point of the balls 19, 20 with respect to the part surrounding them is produced. In the case of translatory compensating movements, only the very small, supporting spring forces in the direction of the spindle 1 act on the balls, with the result that the latter can roll virtually unhindered along the grooves.

Two further holes 24, 25; 24', 25' in the cage serve as leadthroughs for the two screws 13, 13', which are arranged mirror symmetrically with respect to each other, with springs 16, 16' which hold the joint parts together in the axial direction in a manner free of play. The construction of the joint from prism grooves which are perpendicular to one another and have balls running in them allows exclusively translatory relative movements. Rotations are excluded The forward feed of the spindle nut, which feed corresponds to the rotation of the spindle, is therefore transmitted to the slide in a manner free of play.

In the case of the exemplary embodiment illustrated in FIG. 4, a linear prism groove 17, which cuts across the spindle axis, and two linear prism grooves 27, 28 which run perpendicularly to the prism groove 17 and are at a distance from the spindle axis interact in each case. The balls are retained here in the intersecting point of the prism grooves without a cage. In the exemplary embodiment illustrated, the prism grooves, two in each case parallel to each other, are situated in the upper surface of the intermediate plate 9 and the bearing plate 6, as can be gathered from the comparison of the sectional illustrations from FIG. 4a and FIG. 4b which are rotated through 90°. FIGS. 4c and 4d show the balls in the intersecting point of the prism grooves.

What is claimed is:

1. A screw mechanism comprising:

a spindle (1) which is secured in an axial direction and which has a spindle axis (1'), a spindle nut (5) which is connected to a slide (7), which can be driven and which is guided in the axial direction, and a joint which is provided between the spindle nut (5) and the slide (7) and which compensates for relative transverse movements and tilting between the spindle nut (5) and the slide (7), said joint being formed symmetrically with respect to the spindle axis (1') and having two joint axes which are perpendicular to each other, which intersect on the spindle axis (1') and which are assigned at one end to the transverse movement of a bearing plate (6), said joint being connected to the spindle nut (5) at one end thereof, and connected at the other end to the transverse movement of a bearing plate (8) that is connected to the slide (7), said joint containing an intermediate plate (9) via which the bearing plates (6, 8) are connected pivotably to each other in order to compensate for any tilting of their joint axes, and wherein the joint axes are each formed by two balls (19, 20; 1 9', 20') which are aligned with one another on opposite sides of the spindle axis (1'), and which are mounted in mutually opposite prism grooves (17, 18; 17', 18') in the bearing plates (6, 8) and the intermediate plate (9), wherein the bearing plates (6, 8) and the intermediate plate(9) are biased together under spring pressure (13, 16; 13', 16').

2. The screw mechanism as claimed in claim 1, wherein the mutually opposite prism grooves (17, 18; 17', 18') point in the same direction.

3. The screw mechanism as claimed in claim 2, wherein the longitudinal extent of the mutually opposite prism grooves (17, 18; 17', 18') for each ball (19, 20; 19', 20') is restricted.

4. The screw mechanism as claimed in claim 2, wherein the prism grooves (17, 18; 17', 18') are open on both sides, and the balls (19, 20; 19', 20') are secured in a cage (21; 21') against lateral migration.

5. The screw mechanism as claimed in claim 4, wherein the cage (21; 21') comprises a thin disk which has elongate holes aligned perpendicular to the direction of the prism grooves, the centering edges engaging in the holes in the mutually opposite bearing and intermediate plates, a centering edge being enclosed in the hole in the intermediate plate (9) with radial play.

6. The screw mechanism as claimed in claim 4, wherein:

the cage (21, 21') comprises a thin disk which has circular holes for holding the balls (19, 20; 19', 20'), the diameter of which holes is larger than the ball diameter, oppositely directed short-spring elements (29, 30; 29', 30') which support the balls are integrally formed on the hole edges in the radial direction, and the cage (21, 21') is retained in a positionally fixed manner in one of the mutually opposite bearing or intermediate plates.

7. The screw mechanism as claimed in claim 5, wherein the cage (21, 21') is designed in such a manner that its centering edges (22) cause a restriction of the transverse movement in order to prevent the intermediate plate (9) and the bearing plates (6, 8) from coming into contact with the spindle (1) and the spring pressure elements (13, 16; 13', 16'), respectively.

8. The screw mechanism as claimed in claim 5, wherein a width of the elongate hole is matched to the ball diameter in the radial direction and wherein, in the axial direction, the elongate hole produces a pointlike bearing for the balls (19, 20; 19', 20').

9. The screw mechanism as claimed in claim 4, wherein the cage (21, 21') is manufactured from a plastic material with sliding properties.

10. The screw mechanism as claimed in claim 1, wherein for the mounting of the balls one of the mutually opposite plates has a linear prism groove (17, 17') intersecting the spindle axis, and the other plate has two linear prism grooves (27, 28; 27', 28') which run perpendicular to the prism groove (17, 17') and are at a distance from the spindle axis.

* * * * *